United States Patent
Amy

(10) Patent No.: US 8,029,593 B2
(45) Date of Patent: Oct. 4, 2011

(54) BIOFERTILIZER FOR TREATMENT TO IMPROVE GROWTH OF TURF GRASS AND METHOD OF DEVELOPING THE BIOFERTILIZER

(75) Inventor: Penny Susan Amy, Henderson, NV (US)

(73) Assignee: The Board of Regents of the Nevada System of Higher Education on Behalf of the University of Las Vegas, Nevada, Las Vegas, NV (US)

( * ) Notice: Subject to any disclaimer, the term of this patent is extended or adjusted under 35 U.S.C. 154(b) by 682 days.

(21) Appl. No.: 12/069,530

(22) Filed: Feb. 11, 2008

(65) Prior Publication Data

US 2008/0190158 A1    Aug. 14, 2008

Related U.S. Application Data

(60) Provisional application No. 60/900,633, filed on Feb. 9, 2007.

(51) Int. Cl.
*C05F 11/08* (2006.01)

(52) U.S. Cl. .................................... 71/6; 71/7

(58) Field of Classification Search ............ 71/6–10
See application file for complete search history.

(56) References Cited

U.S. PATENT DOCUMENTS

| | | | |
|---|---|---|---|
| 5,147,441 A * | 9/1992 | Megeed | 71/7 |
| 5,697,186 A * | 12/1997 | Neyra et al. | 47/57.6 |
| 5,702,701 A | 12/1997 | O'Donnell | 424/93.46 |
| 5,951,978 A * | 9/1999 | Red'kina | 424/93.3 |
| 6,025,187 A | 2/2000 | Penaud | 435/262.5 |
| 6,174,472 B1 | 1/2001 | Johnson et al. | 264/118 |
| 6,228,806 B1 | 5/2001 | Mehta | 504/117 |
| 6,232,270 B1 | 5/2001 | Branly et al. | 504/117 |
| 6,312,492 B1 | 11/2001 | Wilson | 71/21 |
| 6,495,362 B1 | 12/2002 | Nautiyal | 435/252.34 |
| 6,878,179 B2 | 4/2005 | Porubcan | 71/6 |
| 2008/0213225 A1* | 9/2008 | Banerjee et al. | 424/93.4 |

FOREIGN PATENT DOCUMENTS

| | | | |
|---|---|---|---|
| CA | 1172585 | 8/1984 | 195/34.4 |
| WO | 84/01686 * | 5/1984 | |

OTHER PUBLICATIONS

Biology and Fertility of Soils © Springer-Verlag 1987 , "Yield Response of Spring Wheat Cultivars (*Triticum aestivum* and *T. turgidum*) to inoculation with *Azospirillum brasilense* Under Field Conditions" vol. 4 pp. 27-35.

Todar, Kenneth, "*Bacillus cereus* Food Poisoning (p. 1)," Todar's Online Textbook of Bacteriology, www.textbookofbacteriology.net/B.cereus.html; 2011 Kenneth Todar, PhD (2 pgs).

* cited by examiner

*Primary Examiner* — Wayne Langel

(74) *Attorney, Agent, or Firm* — Mark A Litman & Associates, PA

(57) ABSTRACT

Biofertilizers have been identified as an alternative to chemical fertilization to increase soil fertility and crop production using sustainable farming. Treatment is with at least a proprietary formulation of a nitrogen-fixing consortium and *Azospirillum brasilense*. The application of biofertilizers resulted in higher biomass compared to chemical fertilizer treatment. Chlorophyll and nitrogen levels in these grass plants are also likely to be improved.

15 Claims, No Drawings

BIOFERTILIZER FOR TREATMENT TO IMPROVE GROWTH OF TURF GRASS AND METHOD OF DEVELOPING THE BIOFERTILIZER

RELATED APPLICATIONS DATA

This application claims priority from U.S. Provisional Patent Application Ser. No. 60/900,633, filed Feb. 9, 2007.

GOVERNMENT SPONSORSHIP INFORMATION

No Federal government contracts or direct project grants were used in the development of this invention.

BACKGROUND OF THE INVENTION

1. Field of the Invention

The present invention relates to the field of biofertilization and chemical fertilization to increase soil fertility and crop production as an adjunct to sustainable farming technology.

2. Background of the Art

There is a long history of soil fertilization. The term 'fertilization' includes the addition of elements or other materials to the soil to increase or maintain plant yields. Fertilizers may be organic or inorganic. Organic fertilizers are usually manures and waste materials which in addition to providing small amounts of growth elements also serve as conditioners for the soil. Commercial fertilizers are most often inorganic.

Methods of applying fertilizers vary widely and depend on such factors as crop type, stage of growth, application rates, physical and chemical properties of the fertilizer, and soil type. Two basic application methods are used, bulk spreading and precision placement. Time and labor are saved by the practice of bulk spreading, in which the fertilizer is broadcast over the entire area by using large machines which cover many acres in a short time. Precision placement, in which the fertilizer is applied in one or more bands in a definite relationship to the seed or plants, requires different equipment and time, but usually smaller amounts of fertilizer are needed to produce a given yield increase.

For some deep-rooted plants, subsoil fertilization to depths of 12-20 in. (30-50 cm) is advantageous. This is usually a separate operation from planting, and uses a modified subsoil plow followed by equipment to bed soil over the plow furrow, thereby eliminating rough soil conditions unfavorable for good seed germination. Top-dressings are usually applied by broadcasting over the soil surface for closely spaced crops such as small grains.

Nonvolatile fertilizer solutions are often pumped into the supply lines of irrigation systems to allow simultaneous fertilization and irrigation. With the exception of bulk spreaders and other broadcasters, most fertilizer application devices are built as attachments which can be mounted in conjunction with planters, cultivators, and herbicide applicators. Often the tanks, pumps, and controls used for liquid fertilizers are also used for applying other chemicals such as insecticides.

One of the major problems with these types of chemical fertilization is the fact that there are harmful effects of chemical fertilizers and their impact on the environment through nitrate contamination of ground and run-off waters. The sheer volume of fertilizers added to the soil each year is itself a major contamination problem, even if the fertilizing effects are immediately beneficial in some perspectives. It is reported that, in the United States, generally, 50% of chemical fertilizer applied to soil bypasses utilization in the soil, runs off, usually untreated, in ground water, and end up in aquifers where it represents, among other problems, a public health hazard. Alternatives to mass application chemical fertilization are therefore extremely desirable.

Biofertilizers (fertilization compositions comprising microbes) have been identified as an alternative to chemical fertilization to increase soil fertility and crop production using sustainable farming. The use of nitrogen-fixing bacteria provides plants with nitrogen compounds needed for growth and there is increasing evidence that other bacteria provide plant hormones to enhance growth.

Turf grass uses large amounts of nitrogen in the production of needed organic compounds. Most atmospheric, nitrogen is metabolically unavailable to plants and animals. The only exceptions occur when certain species of bacteria are capable of fixing atmospheric nitrogen creating organic, nitrogen-containing compounds. Bacteria with this capability are called diazotrophs. Associative nitrogen-fixing bacteria reside in close proximity to plant roots where they make a contribution of biologically available nitrogen to plants and plants to provide nutrients to the nitrogen-fixing bacteria. In addition to nitrogen fixation, *Azospirillum brasilense* produces plant growth hormones which have been shown to increase the number of lateral roots and root hairs (Tien, et al., 1979). These two additions could explain the increased total plant weight in the UNLV Biofertilizer treatment groups.

For the Biofertilizer, there is possibly a critical, minimum population size of diazotrophic bacteria needed for significant rates of nitrogen fixation (Wright, et al., 1981). Nitrogen fixation rates are linked to microbial growth and dependent on plant cell proliferation (National Research Council, 1994). It is known that certain strains of diazotrophs, known to be efficient fixers of nitrogen, when inoculated into the soil do not compete well against the diazotrophs already present in the soil, reducing the inoculation benefit.

U.S. Pat. No. 6,495,362 (Nautiyal) describes a biologically pure culture of bacteria that suppresses diseases caused by pathogens in chickpea crops and a culture of bacteria comprising a strain of *Pseudomonas fluorescens*. The patent discloses a simple live-sand or soil assay method for large scale screening of the rhizosphere-competent bacteria effective in suppressing plant pathogens. Screening for chickpea rhizosphere competitive bacteria having biological control properties were conducted at three different stages: (1) development of a screening method for large scale initial selection of bacterial isolates from chickpea rhizosphere, (2) testing of biocontrol activity under in vitro conditions, and (3) screening of antibiotic resistant mutants for rhizosphere competence in nonsterile field soil, which assay is used to disclose one *Pseudomonas fluorescens* NBRI 1303 (ATCC 55939) which is effective in suppressing plant pathogens, including *Fusarium oxysporum* f. sp. *ciceri, Rhizoctonia bataticola* and *Phthium* sp. in chickpeas, and the purified bacterial strain can be used as active agent for biocontrol compositions and can also be used for enhancement of chickpea plant growth and yield, as well as for the production of antibiotics directed towards phytopathogenic fungal diseases. The reference discloses that *P. fluorescens* NBRI 1303 (ATCC 55939) is an aggressive chickpea rhizosphere colonizer and can survive in the field at temperatures in the range of 0° C. to 55° C. In addition, this bacterial strain appears to produce one or more antifungal metabolites which inhibit the growth of pathogenic fungi *F. oxysporum* f. sp. *ciceri, R. bataticola* and *Pythium* sp. or other fungal pathogens of chickpeas since the culture supernatant exhibits growth inhibitory effects for pathogenic fungi *F. oxysporum* f. sp. *ciceri, R. bataticola* and *Pythium* sp. A greenhouse test and field trial of *P. fluorescens* demonstrated the usefulness of the strain as an inoculum for improved plant performance and therefore *P. fluorescens* may be used as a biocontrol agent.

Various strains of saprophytic soil bacteria are known to influence plant growth in different types of plants. For example, the inoculation of nonleguminous crops with selected strains of free-living, nitrogen-fixing species of *Azotobacter* and *Azospirillum* can cause significant increases in crop yield under field conditions. Kapulnik et al. (1981); Brown (1974). But bacteria of these genera are generally unable to compete adequately with native flora to assure multiplication. When used in seed inoculants, moreover, they are not "root colonizers," i.e., they are incapable of transferring in large numbers from seed to roots and, consequently, cannot keep pace with developing roots. See, e.g., Reynlers & Vlassak (1982). As a consequence, impractically large amounts of inoculum are required to obtain a meaningful effect on plant growth.

Y. Kapulnik et al. inoculation of *Azospirillium brasilense* in Spring wheat, Biology an Fertility of Soils© Springer-Verlag 1987 Biol Fertil Soils (1987) 4:27-35 shows very limited utility for *Azosprillium brasilense* in treatment of Spring Wheat and especially Miriam Spring Wheat, while finding inconclusive or neutral results for other wheats.

The mechanism(s) by which soil bacteria may influence plant growth has been the subject of extensive investigation. Research into the role of microbial iron transport agents (siderophores) in the root zones of plants (the "rhizosphere") is one mechanism by which some fluorescent pseudomonad species promote plant growth, namely, by antagonism (antibiosis, competition or exploitation) to deleterious indigenous microorganisms, resulting in their exclusion from roots.

Canadian patent No. 1,172,585 discloses the use of particular strains of naturally-occurring pseudomonads to benefit plant growth in root crops by reducing the population of other indigenous root-zone microbiota that adversely influence plant growth. Similarly, the results of one study indicated that growth-promotion in radish and potato by rhizobacteria did not occur under gnotobiotic conditions, when competition between other strains was not a factor, and hence, that rhizobacteria promote plant growth indirectly, by interaction of the rhizobacteria with native root microflora, rather than directly by microbial production of growth-promoting substances.

Another proposed mechanism for plant growth promotion by soil bacteria involves a direct stimulation of growth by bacterial elaboration of substances like nitrogen, plant hormones such as auxins and giberellins, and compounds that promote the mineralization of phosphates. But the hypothesis that elaboration of bacterial products is related to enhanced growth in plants has lacked definitive supporting data.

For example, investigations of root-elongation promotion in grasses by an auxin-overproducer mutant of *Azospirillum* prompted the conclusion that observed levels of the bacterially-produced auxin bore no direct relation to the root elongation. Using a petri plate bioassay for root elongation in wheat, Kapulnik et al (1985) found that seed inoculation with an *A. brasilense* strain resulted in root elongation in one bacterial concentration range but inhibition of root development in another, higher range. Kapulnik et al also reported that *A. brasilense* supernatants did not affect root length, a result arguing against a substantial role for a bacterial product in promoting root elongation. A screening of rhizosphere bacterial metabolites for in situ effects on seedling root development likewise yielded mixed results, with the observed effects ranging from complete inhibition to unaffected development; notably, no growth stimulation per se was reported.

The term "root-colonizing" is used to denote bacteria, including rhizospheric and non-rhizospheric strains, that can transfer from seed (as an inoculum component) to roots developing from the seed, and are able to maintain a stable association with the root system of the plant as it grows.

U.S. Pat. No. 6,878,179 (Porubcan) discloses fertilizer compositions for plant production comprised of decontaminated manure and *Bacillus* spores, preferably a humic acid derived from lignite and, optionally, one or more N-containing compounds, P-containing compounds, K-containing compounds, and combinations of two or more of these compounds. Preferred compositions are those wherein the ingredients are blended into an admixture resulting in a granular product. Other preferred compositions are those blended into an admixture resulting in a powdered product. Preferably, the ingredients are formed into hardened prills or pellets. Processes for production and use are also presented.

U.S. Pat. No. 6,228,806 (Mehta) describes a biochemical fertilizer. A broad list of microorganisms, listed by genera, is provided, including *Bacillus*. The need for microbial nutrients is mentioned as part of the microorganism ingredient, not the bulk organic ingredient U.S. Pat. No. 6,312,492 (Wilson) discloses improved fertilizer effect of poultry manure by adding sulfuric acid followed by drying. Wilson teaches specifically the co-addition of cellulose containing materials.

U.S. Pat. No. 6,232,270 (Branly et al.) focuses on using *Bacillus* bacteria to enhance the effectiveness of chemical herbicides and lists every imaginable *Bacillus* ever discovered, and claims they will all benefit this purpose.

U.S. Pat. No. 5,702,701 (O'Donnell) describes the use of a unique strain of *Bacillus* laterosporus (BOD strain) to benefit plants.

U.S. Pat. No. 6,174,472 describes a process of forming a pellet comprised of at least sixty percent (60%) composted sewer sludge, up to forty percent (40%) cellulosic plant material and up to fifteen percent (15%) nutrient materials and chemicals for soil enhancement and plant nutrition that provides a combination of both long and short term beneficiation of soil and herbage and has no pathogenic microbes above regulatory ranges. The composted sewer sludge comprises primary sewer sludge admixed with cellulosic plant material that is thermally treated at temperatures between 140 and 180° F. during composting to destroy mesophyllic pathogenic microbes and the viability of reproducible botanicals including seeds, but leave most thermophilic soil enhancing microbes in a viable state. Additional fibrous cellulosic material and chemicals are admixed with the composted sewer sludge and the mixture pelletized in a thermal process that raises pellet temperature to between 140 to 180° F. The nutrient and chemical materials selectively comprise nitrogenous fertilizers, phosphate, potash, trace elements, herbicides, insecticides and botanical chemicals.

U.S. Pat. No. 6,025,187 describes bacterial complexes comprising at least one non-pathogenic *Bacillus* and at least one non-pathogenic *Lactobacillus* which essentially allow the conversion of inorganic nitrogen into organic nitrogen in the form of bacterial proteins, which allow the conversion of excrement into nitrogenous compounds (stable nitrogenous compounds and/or compost) and, particularly for waste having a sufficient C/N ratio (in relation to the level of solids content), into non-polluting compounds rich in fulvic acid and humic acid, by digestion and conversion of excrements, while at the same time removing the associated pathogenic germs, in particular *Clostridium, Bacteroides*, colibacilli, *Listeria*, salmonellae and staphylococci.

SUMMARY OF THE INVENTION

A composition forming a biofertilizer replaces conventional chemical fertilizers for vegetation, including turf grass, for growth and enhancement. The composition spares the environment of excess nitrogen, reduces nitrate and nitrite contamination, and may lower costs associated with typical use of chemical fertilizer. The composition comprises a consortium of bacteria including (at least) *Azospirillum brasilense*, in combination with bacteria providing other classes of functions.

DETAILED DESCRIPTION OF THE INVENTION

Turf grasses are a well-accepted and defined class of grasses that are natural or hybridized and are used extensively in landscaping, parks, golf courses, sports playing fields, lawn tennis courts, gardens, walkpaths and the like for their unique and individualized characteristics. Among the more common turf grasses are annual bluegrass, annual ryegrass, bahiagrass, bermudagrass, buffalograss, carpetgrass, centipedegrass, creeping bentgrass, colonial bentgrass, fine fescue, hybrid bermudagrass, Kentucky bluegrass, kikuyugrass, orchardgrass, perennial ryegrass, quackgrass, rough bluegrass, seashore *paspalum*, St. Augustinegrass, tall fescue and zoysiagrass. This is not intended to be a limiting list of the class of turf grasses.

Because of the often critical need for the highest quality maintenance of plots of field grasses, especially on golf courses, sports playing fields, and public parks, extensive maintenance is performed on the turf grass plots. This often means regular treatments including fertilization, aeration, dethatching and other labor intensive and material intensive treatments. Because of the large areas of treated turf grass, with golf courses for example exceeding 100 acres, large volumes of chemicals have to be applied, often with inefficient volume controls. The tendency has been to assure adequate chemical coverage by excessive application. This is desirable neither from an agricultural standpoint (as excessive fertilization can adversely affect the grass and the soil) or an environmental consideration, as excess chemicals run off in greater concentrations.

It has therefore been an aspect of the present technology to consider the application of biofertilizers that can be applied in lower concentrations per area, applied less frequently, and provide some self-sustaining capacity over at least a single season if not multiple seasons.

The microorganisms living in the soil constitute major amounts of biomass. Furthermore, certain soil bacteria are associated with the rhizosphere of plants. As a result of these findings, application of beneficial microorganisms in agricultural practices began around 60 years ago (Wu et al., 2005). Biological control of plant pathogens have been investigated for use as a treatment using rhizosphere-dwelling bacteria (rhizobacteria) resulting in prevention of plant diseases (Weller, 1988). Moreover, it has been documented that some rhizobacteria and fungal species promote beneficial effects on plant growth. These benefits include nitrogen-fixation, phosphorous solubilizing and potassium solubilizing.

A biofertilizer was developed herein using an enrichment growth medium for nitrogen-fixing bacteria. In addition, because of its ability to produce plant growth hormones, *Azospirillum brasilense* was included as a comparison in the experimental design. The results of the enriched biofertilizer were compared favorably with biological and chemical treatments using applications onto laboratory plots of turfgrass.

Biological nitrogen fixation (BNF) research has recognized the negative effects overuse of chemical fertilizers have on the environment. Approximately 50% of fertilizer nitrogen is used by plants. The remaining 50% is either converted back to atmospheric nitrogen or leached into groundwater as nitrates thus polluting water supplies (National Research Council, 1994).

An interesting consideration in the application of bacterial biofertilizers is the fact that an initial application amount or concentration amount of the biofertilizer can vary over an extremely wide range and be effective. Because the bacteria replicate under natural (ambient) conditions, as long as the environment is conducive to viability and growth of the bacteria, the initial amount injected into soil may be small, but will continue to increase towards highest tolerable or optimal amounts. There might be some lag time in the efficacy of the bacteria, at least measurable efficacy, but efficacy will be reached as the bacteria multiply and produces sufficient amounts of bye-products that are useful as fertilizer for the plants. If a more immediate active effect is desired, the user need only increase the amount of bacteria applied in the first application. Concentrations of bacteria within soil can be present over a wide range and be useful. Some beneficial bacteria, for example, are known to have average approximate concentrations of 30 million bacteria per gram under stable ambient conditions. With the use of the chemical fertilizers described herein optimizing soil conditions and growth conditions, concentrations of 50 million, 60 million or even 80 million bacteria per gram are useful and achievable.

However, it would not necessarily be economically advantageous to attempt to apply the highest concentrations in an initial application, and as indicated above, the bacteria can grow to higher concentrations under suitable ambient conditions. Therefore, application concentrations may be as little as tens or hundreds of bacteria/$cm^2$ of soil, hundreds or bacteria/plant or less. Therefore, the application may be as low as an average of at least 10 bacteria (within the identified classes of the present disclosure) per $cm^2$ soil or plant, at least 50 bacteria per $cm^2$ soil or plant, at least 250 bacteria per $cm^2$ soil or plant, at least 1000 bacteria per $cm^2$ soil or plant, at least 20,000 bacteria per $cm^2$ soil or plant, and up to (or even in excess of) the full optimal concentration of bacteria on the plant and in the soils ultimately desired (e.g., the tens of millions/gram soil indicated above.

Turf grass uses large amounts of nitrogen in the assimilation of needed organic compounds. Most of the molecular nitrogen that exists is metabolically unavailable to plants and animals. The only exceptions are certain species of bacteria capable of fixing atmospheric nitrogen (diazotrophs). Associative nitrogen-fixing bacteria reside in close proximity to plant roots where they make a contribution of biologically available nitrogen to plants and plants provide nutrients to the nitrogen-fixing bacteria. In addition to nitrogen fixation, *Azospirillum brasilense* produces plant growth hormones which have been shown to increase the number of lateral roots and root hairs. Nitrogen-fixation and hormone production could explain the increased total plant weight in the biofertilizer treatment groups described herein, which has not been previously reported.

Preliminary data by the inventors on the effects of the proprietary biofertilizer showed an increase in plant biomass compared to the water control and the chemical fertilizer. *Azospirillum brasilense* alone did not greater increase plant biomass compared to the proprietary biofertilizer, but increased plant biomass compared to the chemical fertilizer and water control. However, chlorophyll content was highest with the chemical fertilizer as opposed to the biofertilizer treatments and water.

A possible explanation is the chemical fertilizer provides an immediate source of metabolically available nitrogen and the testing was not performed over a sufficient length of time to allow the bacteria to reach optimal concentrations and provide nitrogen over a significant time. For the biofertilizer, there is possibly a critical population size of diazotrophic bacteria needed for significant rates of nitrogen fixation. Nitrogen fixation rates are linked to microbial growth and dependent on cell proliferation (National Research Council, 1994). It is known that efficient strains of diazotrophs which are inoculated into the soil do not compete well against the diazotrophs already present in the soil.

Future work will deal with adjusting dosing regimens of the proprietary biofertilizer and *Azospirillum brasilense* to effectively compete with indigenous rhizosphere microbes, or initial treatments or selective treatments to provide an advantageous environment for the biofertilizer and *Azospirillum brasilense* as compared to the indigenous rhizosphere microbes. Longer incubation periods may be required before harvesting to notice any significant long term effects of nitrogen-fixing activity. Investigation into the application of biologically active substances to stimulate nitrogen fixation may be useful as demonstrated with *Azospirillum brasilense*.

In general, the technology described herein enables a fertilizer composition comprising a bacterial consortium of *Azospirillum brasilense* in combination with at least one other bacterium that provides a function selected from the group consisting of a) heavy metal fixation; b) cause lysis of other bacteria; c) obligate predation; d) nitrogen-fixing symbiosis; e) siderophore producers; f) nitrate reduction; and g) nematocidal activity. The fertilizer composition may comprise at least 5% by total bacterial content of the *Azospirillum brasilense*; at least 30% by total bacterial content of the *Azospirillum brasilense*; or at least 50% by total bacterial content of the *Azospirillum brasilense*. The fertilizer composition may have the bacterial consortium comprise *Azospirillum brasilense* in combination with at least two other bacteria that each provides a function selected from the group consisting of a) heavy metal fixation; b) obligate predation; c) siderophore production; and d) nematocidal activity; *Azospirillum brasilense* in combination with at least two other bacteria that each provides a function selected from the group consisting of a) heavy metal fixation; b) obligate predation; and c) nematocidal activity; or *Azospirillum brasilense* in combination with at least two other bacteria that each provides a function selected from the group consisting of a) heavy metal fixation; and b) nematocidal activity. As a specific example, the fertilizer composition may comprise at least two bacteria selected from the group consisting of *Ochrobacterium tritici* sp.; *Ensifer adhaerens*; *Sinorhizobium* sp; *Enterobacter* sp.; *Zooglea* sp.; *Brevibacillus* sp.; *Bacillus cereus*; and *Agrobacterium tumefaciens*; or at least two bacteria selected from the group consisting of *Ochrobacterium tritici* sp.; *Ensifer adhaerens*; *Sinorhizobium* sp; *Enterobacter* sp.; *Zooglea* sp.; *Brevibacillus* sp.; and *Bacillus cereus*.

The fertilizer composition may be blended into an admixture resulting in a granular or powdered product (e.g., with binding agents that are neutral or active with the consortium) or the composition is formed into prills or pellets. The fertilizer composition may also contain an N compound present in addition to the consortium, and the nitrogen containing compound is selected from the group consisting of urea, ammonium sulfate, ammonium nitrate, ammonium phosphate, calcium nitrate, potassium nitrate, sodium nitrate; and a phosphorous containing compound is present that is selected from the group consisting of ammonium phosphate, superphosphate, $Ca(H_2PO_4)_2$, tricalcium phosphate, phosphate salts of sodium or potassium, including orthophosphate salts; and a potassium containing compound is present that is selected from the group consisting of KCl, potassium sulfate, potassium nitrate, orthophosphate salts of potassium and phosphate salts of potassium.

The method of fertilizing turf grass according to the present technology would comprise applying the fertilizer composition described herein to soil having seeds or growth of turf grass thereon.

A bacteria consortium according to the present technology would include at least combination of bacteria that provide at least some of the functions selected from the non-limiting following group: (a) bacteria that fix nitrogen; (b) bacteria that lyse other bacteria in the soil and (c) bacteria that produce siderophores. An important optional ingredient is (d) bacteria that reduce nitrates. An optional ingredient would be (e) bacteria that have nematocidal activity. This consortium may be used in combination with other bacteria and chemistry such as the *Azospirillum brasilense* (preferably as at least 5% of the total bacterial content, up to 50% or even 60% of the total bacterial content). Some of the properties or functions of bacteria are known to overlap. For example, some bacteria that lyse may also be known to be bacteria that are obligate predators. The terms need not be exclusive, and where one bacteria is present that provides only a single function (e.g., lysing), the other bacteria may be used to provide the alternative function. Similarly, with respect to the bacteria that produce sidephores, these bacteria overlap with bacteria that fix heavy metals, which may also be used on combination with the underlying 5 components of the consortium.

Although chemical fertilizers tend to "green up" the plants more rapidly than the biological fertilizer consortium, the chemical fertilizer intuitively must be applied more frequently as it is used up, while the bacterial components reproduce and can remain active at least through an entire growing season or longer.

Example

UNLV Biofertilizer Lyophilized Specimen 1 g lyophilized specimen (Freeze dried) was reconstituted in 1 L Burke's medium
After reconstituting, stock culture was aliquoted (50 mL volumes). This final stock culture was stored at 4° C.
Burk's Medium (1 L volume)

| | |
|---|---|
| $K_2HPO_4$ | 0.8 g |
| $KH_2PO_4$ | 0.2 g |
| $MgSO_4 \cdot 7H_2O$ | 0.2 g |
| NaCl | 0.2 g |
| $CaSO_4$ | 0.1 g |
| $FeCl_3 \cdot 6H_2O$ | 0.015 g |
| $Na_2MoO_4 \cdot 2H_2O$ | 0.003 g |
| Sucrose | 20 g |
| $H_3BO_3$ | 100 mcg |
| $ZnSO_4 \cdot 7H_2O$ | 100 mcg |
| $MnSO_4 \cdot 4H_2O$ | 10 mcg |
| $CuSO_4 \cdot 5H_2O$ | 3.0 mcg |
| KI | 1.0 mcg |

Results of DNA Sequencing—

Isolates Enriched from Burk's Medium (Specific Example of a Proprietary Consortium)

| Isolate | Function |
| --- | --- |
| *Ochrobacterium tritici* sp. | Heavy metal tolerance |
| *Ensifer adhaerens* | Causes lysis of other bacteria. Obligate predator under nutrient-limiting conditions. |
| *Sinorhizobium* sp. | $N_2$-fixing symbiants |
| *Enterobacter* sp. | Diazotrophic Production of siderophores - increased iron availability in rhizosphere |
| *Zooglea* sp. | Possible function: reduction of nitrates |
| *Brevibacillus* sp. | Inhibition of root-infecting fungi, nematicidal activity |
| *Bacillus cereus* | Inhibition of root-infecting fungi, nematicidal activity |
| *Agrobacterium tumefaciens* | Function unknown - known plant pathogen Certain *Rhizobium* sp. closely related to *Agrobacterium* |

Reconstituted ATCC29145—*Azospirillum brasilense*

ATCC Medium for *Azospirillum brasilense*

*Azospirillum brasilense*

Function: nitrogen fixation, production of plant growth hormones

| | |
| --- | --- |
| $KH_2PO_4$ | 0.4 g |
| $K_2HPO_4$ | 0.1 g |
| $MgSO_4*7H_2O$ | 0.2 g |
| NaCl | 0.1 g |
| $CaCl_2$ | 0.02 g |
| $FeCl_3$ | 0.01 g |
| $Na_2MoO_4$ | 0.002 g |
| Sodium malate | 5.0 g |
| Yeast extract | 0.05 g |

Distilled water = 1.0 L
Adjust pH 7.2-7.4

2 mL of AB medium was added to a plate of pure *Azospirillum brasilense* culture.

Cells were scraped off with the medium and collected.

A 1 L volume of AB medium was inoculated with the cells recovered from the agar plate.

Broth culture was incubated at 30° C. for 10 days.

Absorbance readings (600 nm) were taken at day 1, 2, 7, and 10.

Broth culture transferred to 4° C. prior to inoculation of plants.

Application Example

Grass seed, 0.4 g (Scott's Tall Fescue) per plant

Potting soil (Kellogg's Patio Plus)

Proprietary biofertilizer consortium

*Azospirillum brasilense* (log phase of growth as determined by optical density readings at 600 nm)

Commercial chemical fertilizer (Peters Professional Plant Food, N—20% P—20% K—20%)

Set Up:

Separate grass tufts were started by planting 0.4 g grass seed into each of the individual wells of a 12-plant plastic tray. Replicates of 24 plants were grown for each treatment group. The treatment groups are:

Water

Commercial chemical fertilizer (N—20% P—20% K—20%)

Proprietary biofertilizer consortium

*Azospirillum brasilense*

1:1 mixture of *Azospirillum brasilense* and biofertilizer consortium

Treatments:

A volume of 5 mL of treatment was added to each grass tuft plant on day 0 and day 7. The plants were watered daily for a total of 14 days. Plants were then harvested and air dried at room temperature for 7 days. Soil was removed from the roots and the dried plants were weighed.

Chlorophyll Determinations:

Replicates of 12 plants were grown for each treatment group. Grass shoots were cut and weighed fresh. On same day, the shoots were ground in a total volume of 50 mL water. The extracted chlorophyll was measured at 647 nm, 664 nm, and 750 nm. Total chlorophyll per g shoot weight was calculated for each plant using equations from Moran, et al., 1980.

The 1:1 mixture of *Azospirillum brasilense* and biofertilizer consortium outperformed all four comparative fertilizers by providing significant increase in biomass over time.

It should be appreciated that enablement of the methods of the present technology is quite simply provided herein. At a minimum to practice this technology, one need only provide the biofertilizer and *Azospirillum brasilense* in an aqueous carrier and spray the material onto the soil and/or plant/seeded area under conditions that would not immediately destroy the bacteria, whatever those extreme conditions might be. The level of skill for the actual practice of the technology is therefore much lower than the level of skill needed to discover and invent the concept of the biofertilizer and *Azospirillum brasilense* application to plants and especially the specific classes of plants to be treated herein.

It should be further understood that even though specific examples are given of adjunct materials (e.g., the cointroduced chemical fertilizers, etc.), that the adjunct or ancillary technology described herein constitutes examples within generic concepts and should not be construed as limiting the scope of the invention with respect to the species disclosed within the generic classes of materials defined herein. These technologies may be used with natural flora or transgenic flora or bred flora.

What is claimed:

1. A fertilizer composition comprising a bacteria consortium of *Azospirillum brasilense* in combination with at least one other bacteria that provides a function selected from the group consisting of: (a) bacteria that fix nitrogen; (b) bacteria that lyse other bacteria in the soil and (c) bacteria that produce siderophores.

2. The fertilizer composition of claim 1 wherein the bacterial consortium of *Azospirillum brasilense* is in combination with at least one other bacteria that each provides a function selected from the group consisting of a) heavy metal fixation; b) obligate predation; and c) nematicidal activity.

3. The fertilizer composition of claim 1 wherein the bacterial consortium comprises *Azospirillum brasilense* in combination with at least two other bacteria that each provides a function selected from the group consisting of a) heavy metal fixation; and b) nematicidal activity.

4. The fertilizer composition of claim 1 comprising at least two bacteria selected from the group consisting of *Ochrobacterium tritici* sp.; *Ensifer adhaerens*; *Sinorhizobium* sp; *Enterobacter* sp.; *Zooglea* sp.; *Brevibacillus* sp.; *Bacillus cereus*; and *Agrobacterium tumefaciens*.

5. The fertilizer composition of claim 2 comprising at least two bacteria selected from the group consisting of *Ochrobacterium tritici* sp.; *Ensifer adhaerens*; *Sinorhizobium* sp; *Enterobacter* sp.; *Zooglea* sp.; *Brevibacillus* sp.; and *Bacillus cereus*.

6. The fertilizer composition of claim 1 where the composition is blended into an admixture resulting in a granular or powdered product.

7. The fertilizer composition of claim 1 where the composition is formed into prills or pellets.

8. The fertilizer composition of claim 1 where an N compound is present in addition to the consortium, and the N-compound is selected from the group consisting of urea, ammonium sulfate, ammonium nitrate, ammonium phosphate, calcium nitrate, potassium nitrate, sodium nitrate; and a P-compound is present that is selected from the group consisting of ammonium phosphate, superphosphate, $Ca(H_2PO_4)_2$, tricalcium phosphate, phosphate salts of sodium or potassium, including orthophosphate salts; and a K-compound is present that is selected from the group consisting of KCl, potassium sulfate, potassium nitrate, orthophosphate salts of potassium and phosphate salts of potassium.

9. The fertilizer composition of claim 1 further comprising (d) bacteria that reduce nitrates.

10. The fertilizer composition of claim 1 further comprising e) bacteria that perform heavy metal fixation.

11. The fertilizer composition of claim 1 further comprising a bacteria that performs nematocidal activity.

12. A method of fertilizing turf grass comprising applying the fertilizer composition of claim 1 to soil having seeds or growth of turf grass thereon.

13. The method of claim 12 wherein the turf grass is selected from the group consisting of annual bluegrass, annual ryegrass, bahiagrass, bermudagrass, buffalograss, carpetgrass, centipedegrass, creeping bentgrass, colonial bentgrass, fine fescue, hybrid bermudagrass, Kentucky bluegrass, kikuyugrass, orchardgrass, perennial ryegrass, quackgrass, rough bluegrass, seashore *paspalum*, St. Augustine grass, tall fescue and zoysiagrass.

14. A method of fertilizing turf grass comprising applying the fertilizer composition of claim 2 to soil having seeds or growth of turf grass thereon.

15. The method of claim 14 wherein the turf grass is selected from the group consisting of annual bluegrass, annual ryegrass, bahiagrass, bermudagrass, buffalograss, carpetgrass, centipedegrass, creeping bentgrass, colonial bentgrass, fine fescue, hybrid bermudagrass, Kentucky bluegrass, kikuyugrass, orchardgrass, perennial ryegrass, quackgrass, rough bluegrass, seashore *paspalum*, St. Augustinegrass, tall fescue and zoysiagrass.

* * * * *